US011922876B2

(12) United States Patent
Bae

(10) Patent No.: US 11,922,876 B2
(45) Date of Patent: Mar. 5, 2024

(54) DISPLAY DEVICE

(71) Applicant: Samsung Display Co., Ltd., Yongin-Si (KR)

(72) Inventor: Min-Seok Bae, Hwaseong-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 0 days.

(21) Appl. No.: 17/899,373

(22) Filed: Aug. 30, 2022

(65) Prior Publication Data

US 2023/0215354 A1 Jul. 6, 2023

(30) Foreign Application Priority Data

Jan. 3, 2022 (KR) ........................ 10-2022-0000468

(51) Int. Cl.
*G09G 3/3233* (2016.01)

(52) U.S. Cl.
CPC ... *G09G 3/3233* (2013.01); *G09G 2300/0426* (2013.01); *G09G 2300/043* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/045* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,111,488 | B2 * | 8/2015 | Kwak | G09G 3/3233 |
| 9,666,132 | B2 * | 5/2017 | Wu | G09G 3/3291 |
| 10,115,343 | B2 | 10/2018 | Kang et al. | |
| 10,360,827 | B2 | 7/2019 | Bi et al. | |
| 10,665,166 | B2 | 5/2020 | Park et al. | |

(Continued)

FOREIGN PATENT DOCUMENTS

| | | | |
|---|---|---|---|
| KR | 10-2017-0074618 | A | 6/2017 |
| KR | 10-2018-0093147 | A | 8/2018 |
| KR | 10-2019-0063625 | A | 6/2019 |

OTHER PUBLICATIONS

Seok-Jeong Song et al., "In-Pixel Mobility Compensation Scheme for AMOLED Pixel Circuits", Journal of Display Technology (vol. 11, No. 2, Feb. 2015).

*Primary Examiner* — Dorothy Harris
(74) *Attorney, Agent, or Firm* — Innovation Counsel LLP

(57) ABSTRACT

Disclosed is a display device, which includes a display panel including a plurality of pixels, and one of the plurality of pixels includes a light emitting device connected to a first reference node and that emits light, a driving transistor connected between a power supply line receiving a power supply voltage and the first reference node, a scan transistor connected between a data line receiving a data signal and the driving transistor and that receives a scan signal, a first capacitor connected between the first reference node and a second reference node, a shared transistor connected between the first reference node and the second reference node and that receives a shared control signal, and the first capacitor and the shared transistor are connected in series between the first reference node and the second reference node, and a control electrode of the driving transistor is connected to the second reference node.

19 Claims, 11 Drawing Sheets

(56) References Cited

U.S. PATENT DOCUMENTS

| | | | | |
|---|---|---|---|---|
| 2011/0199358 | A1* | 8/2011 | Chung | G09G 3/3233 345/77 |
| 2012/0050274 | A1* | 3/2012 | Yoo | G09G 3/003 345/212 |
| 2012/0120042 | A1* | 5/2012 | Tsai | G09G 3/3233 345/76 |
| 2015/0062193 | A1* | 3/2015 | Kanda | G09G 3/3233 345/77 |
| 2016/0071458 | A1* | 3/2016 | Tan | G09G 3/3233 345/82 |
| 2016/0125774 | A1* | 5/2016 | Hwang | G09G 3/3225 345/215 |
| 2016/0189606 | A1* | 6/2016 | Chen | G09G 3/3659 345/78 |
| 2016/0203759 | A1* | 7/2016 | Han | G09G 3/3233 345/212 |
| 2017/0249900 | A1* | 8/2017 | Xiang | G09G 3/3291 |
| 2017/0249903 | A1* | 8/2017 | Xiang | G09G 3/3258 |

* cited by examiner

DISPLAY DEVICE

CROSS-REFERENCE TO RELATED APPLICATIONS

This application claims priority under 35 U.S.C. § 119 to Korean Patent Application No. 10-2022-0000468 filed on Jan. 3, 2022, in the Korean Intellectual Property Office, the disclosures of which are incorporated by reference herein in their entireties.

BACKGROUND

Embodiments of the present disclosure described herein relate to a display device, and more particularly, relate to a display device capable of improving the reliability of display quality.

There are being developed various display devices that are used in a multi-media device such as a television, a mobile phone, a tablet computer, a navigation system, or a game console.

As fields in which these display devices are used are diversified, the types of display panels for displaying an image displayed on display devices are also diversified.

Nowadays, a display panel includes a light emitting display panel. The light emitting display panel may include an organic light emitting display panel or a quantum dot light emitting display panel.

SUMMARY

Embodiments of the present disclosure provide a display device capable of maintaining the reliability of display quality regardless of a change in characteristics of a transistor.

According to an embodiment of the present disclosure, a display device includes a display panel including a plurality of pixels. One of the plurality of pixels includes a light emitting device that is connected to a first reference node to emit light, and a driving transistor connected between a power supply line receiving a power supply voltage and the first reference node. The one of the plurality of pixels includes a scan transistor connected between a data line receiving a data signal and the first reference node, and which receives a scan signal. The one of the plurality of pixels includes a first capacitor connected between the first reference node and a second reference node, and a shared transistor connected between the first reference node and the second reference node, and which receives a shared control signal. The first capacitor and the shared transistor are connected in series between the first reference node and the second reference node. A control electrode of the driving transistor is connected to the second reference node.

According to an embodiment, one of the plurality of pixels may further include a second capacitor connected between the second reference node and a reference voltage line receiving a reference.

According to an embodiment, the reference voltage may be a ground voltage.

According to an embodiment, the driving transistor may include a first electrode connected to the power supply line, a second electrode connected to the first reference node, and a control electrode connected to the second reference node. The scan transistor may include a first electrode connected to the data line, a second electrode connected to the first reference node, and a control electrode that receives the scan signal. The shared transistor may include a first electrode connected to the first reference node, a second electrode connected to the first capacitor, and a control electrode that receives the shared control signal.

According to an embodiment, the first capacitor may include a first electrode connected to the second electrode of the shared transistor and a second electrode connected to the second reference node. The second capacitor may include a first electrode connected to the second reference node and a second electrode connected to the reference voltage line.

According to an embodiment, the one of the plurality of pixels may further include a compensation transistor connected between the power supply line and the second reference node. The compensation transistor may include a first electrode connected to the power supply line, a second electrode connected to the second reference node, and a control electrode that receives a compensation scan signal.

According to an embodiment, the one of the plurality of pixels may further include a first initialization transistor connected between a first initialization line receiving a first initialization voltage and the first reference node. The first initialization transistor may include a first electrode connected to the first reference node, a second electrode connected to the first initialization line, and a control electrode that receives a first initialization scan signal.

According to an embodiment, the one of the plurality of pixels may further include a second initialization transistor connected between a second initialization line receiving a second initialization voltage and the second reference node. The second initialization transistor may include a first electrode connected to the second reference node, a second electrode connected to the second initialization line, and a control electrode that receives a second initialization scan signal.

According to an embodiment, one of the plurality of pixels may further include a light emitting control transistor connected between the power supply line and the driving transistor. The light emitting control transistor may include a first electrode connected to the power supply line, a second electrode connected to the driving transistor, and a control electrode receiving a light emitting control signal.

According to an embodiment, the scan signal may include a scan section for turning on the scan transistor. The compensation scan signal may include a compensation section for turning on the compensation transistor. Within one frame, the scan section and the compensation section may overlap each other.

According to an embodiment, the first initialization scan signal may include a first initialization section for turning on the first initialization transistor. The second initialization scan signal may include a second initialization section for turning on the second initialization transistor. Within the one frame, the second initialization section may precede the scan section and the compensation section, and the first initialization section may follow the scan section and the compensation section.

According to an embodiment, the first initialization scan signal may further include a third initialization section for turning on the first initialization transistor. Within the one frame, the third initialization section may precede the compensation section and the scan section.

According to an embodiment, the shared control signal may include a shared section for turning on the shared transistor. Within one frame, the shared section may follow the first initialization section.

According to an embodiment, the light emitting control signal may include a light emitting section for turning on the light emitting control transistor. Within the one frame, the light emitting section may follow the first initialization section.

According to an embodiment, within the one frame, the shared section and the light emitting section may overlap each other.

According to an embodiment of the present disclosure, a display device includes a display panel including a plurality of pixels. One of the plurality of pixels includes a light emitting device that is connected with a first reference node to emit light, and a driving transistor connected between a power supply line receiving a power supply voltage and the first reference node. The one of the plurality of pixels includes a scan transistor connected between a data line and the first reference node, and which includes a control electrode that receives a scan signal. The one of the plurality of pixels includes a first capacitor connected between the first reference node and a second reference node, and a shared transistor connected between the first reference node and the second reference node, and which receives a shared control signal. The scan signal includes a scan section and a first initialization section for turning on the scan transistor, respectively. During the scan section, a data signal is applied to the data line, and during the first initialization section, a first initialization voltage may be applied to the data line. The first capacitor and the shared transistor are connected in series between the first reference node and the second reference node. A control electrode of the driving transistor is connected to the second reference node.

According to an embodiment, one of the plurality of pixels may further include a second capacitor connected between the second reference node and a reference voltage line receiving a reference voltage. The shared transistor may include a first electrode connected to the first reference node, a second electrode connected to the first capacitor, and the control electrode. The first capacitor may include a first electrode connected to the second electrode of the shared transistor and a second electrode connected to the second reference node. The second capacitor may include a first electrode connected to the second reference node and a second electrode connected to the reference voltage line.

According to an embodiment, the one of the plurality of pixels may further include a light emitting control transistor connected between the power supply line and the driving transistor. The light emitting control transistor may include a first electrode connected to the power supply line, a second electrode connected to the driving transistor, and a control electrode receiving a light emitting control signal. The shared control signal may include a shared section for turning on the shared transistor. The light emitting control signal may include a light emitting section for turning on the light emitting control transistor. Within one frame, the scan section may precede the first initialization section, and the first initialization section may precede the shared section and the light emitting section. Within the one frame, the shared section and the compensation section may overlap each other.

According to an embodiment, the one of the plurality of pixels may further include a compensation transistor connected between the power supply line and the second reference node. The compensation transistor may include a first electrode connected to the power supply line, a second electrode connected to the second reference node, and a control electrode that receives a compensation scan signal. The compensation scan signal may include a compensation section for turning on the compensation transistor. Within the one frame, the compensation section may precede the first initialization section, and the compensation section and the scan section may overlap each other.

According to an embodiment, one of the plurality of pixels may further include an initialization transistor connected between an initialization line receiving a second initialization voltage and the second reference node. The initialization transistor may include a first electrode connected with the second reference node, a second electrode connected with the initialization line, and a control electrode that receives an initialization scan signal. The initialization scan signal may include a second initialization section for turning on the first initialization transistor. Within the one frame, the second initialization section may precede the compensation section and the scan section.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
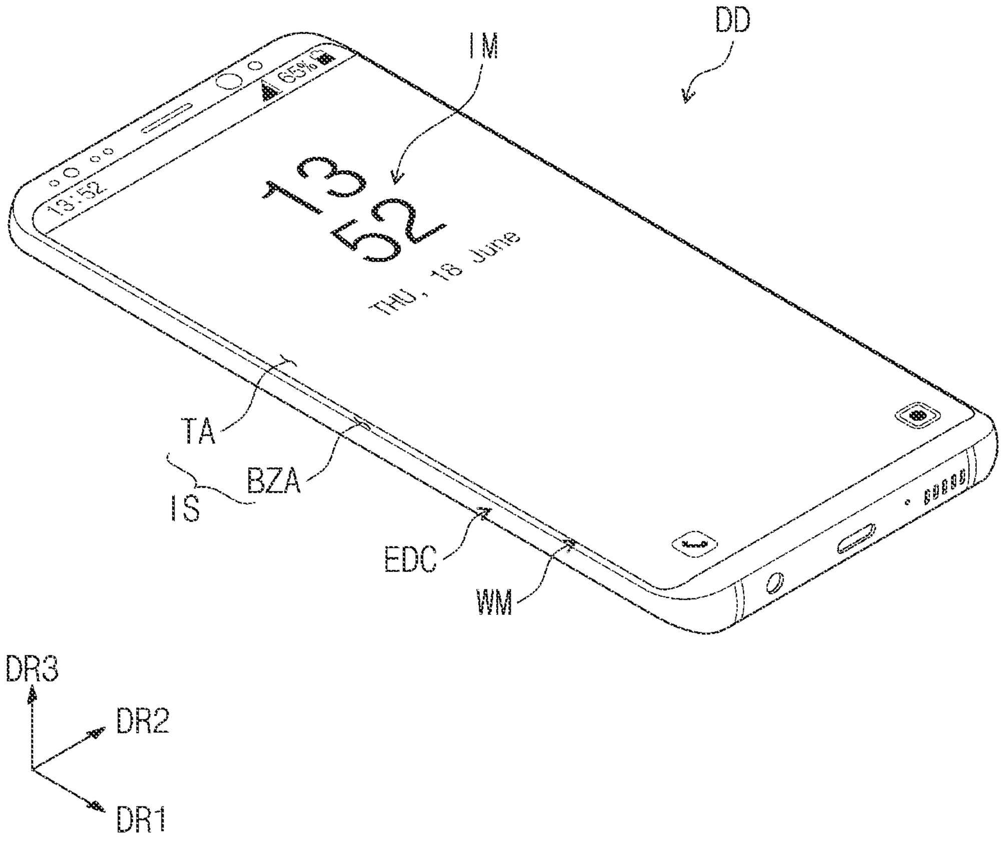
FIG. 1 is a perspective view illustrating a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

FIG. 1 is a perspective view of a display device, according to an embodiment of the present disclosure.

Referring to FIG. 1, a display device DD may be a device activated in response to an electrical signal. FIG. 1 illustrates that the display device DD is a smartphone. However, the present disclosure is not limited thereto. For example, as well as a large-sized display device, such as a television, a monitor, or the like, the display device DD may be a small and medium-sized display device, such as a tablet PC, a notebook computer, a vehicle navigation system, a game console, or the like. The above examples are provided only as an embodiment, and it is obvious that the display device DD may be applied to any other display device(s) without departing from the concept of the present disclosure.

The display device DD has a long side in a first direction DR1 and a short side in a second direction DR2 intersecting the first direction DR1. The display device DD has a quadrangle whose vertexes are rounded. However, the shape of the display device DD is not limited thereto, and various display devices DD having various shapes may be provided. The display device DD may display an image IM in a third direction DR3, on a display surface IS parallel to the first direction DR1 and the second direction DR2. The display surface IS on which the image IM is displayed may correspond to a front surface of the display device DD.

According to an embodiment, a front surface (or top surface) and a rear surface (or a bottom surface) of each of constituents are defined based on a direction that the image IM is displayed. The front surface and the rear surface may be opposite to each other in the third direction DR3, and a normal direction of each of the front surface and the rear surface may be parallel to the third direction DR3.

The distance between the front surface and the rear surface in the third direction DR3 may correspond to the thickness of the display device DD in the third direction DR3. Meanwhile, directions that the first, second, and third directions DR1, DR2, and, DR3 indicate may be a relative concept and may be changed to different directions.

The display surface IS of the display device DD may be divided into a transparent area TA and a bezel area BZA. The transparent area TA may be an area in which the image IM is displayed. A user visually perceives the image IM through the transparent area TA. In this embodiment, the transparent area TA is illustrated in the shape of a quadrangle whose vertexes are rounded. However, the transparent area TA is illustrated by way of example. For example, the transparent area TA may have various shapes, not limited to any one embodiment.

The bezel area BZA is disposed adjacent to the transparent area TA. The bezel area BZA may have a given color. The bezel area BZA may surround the transparent area TA. Accordingly, the shape of the transparent area TA may be substantially defined by the bezel area BZA. However, the bezel area BZA is illustrated by way of example. The bezel area BZA may be disposed adjacent to only one side of the transparent area TA or may be omitted. According to an embodiment of the present disclosure, the display device DD may include various embodiments, and not limited to any one embodiment.

The display device DD includes a window WM and an external case EDC. The window WM may include a transparent material through which the image IM may be visible. For example, the window WM may be formed of glass, sapphire, plastic, or the like. The external case EDC may be coupled to the window WM to define the outer appearance of the display device DD. The external case EDC may absorb external shocks from the outside and may prevent a foreign material/moisture or the like from being infiltrated into the display device DD such that components accommodated in the external case EDC are protected.

Figure 2:
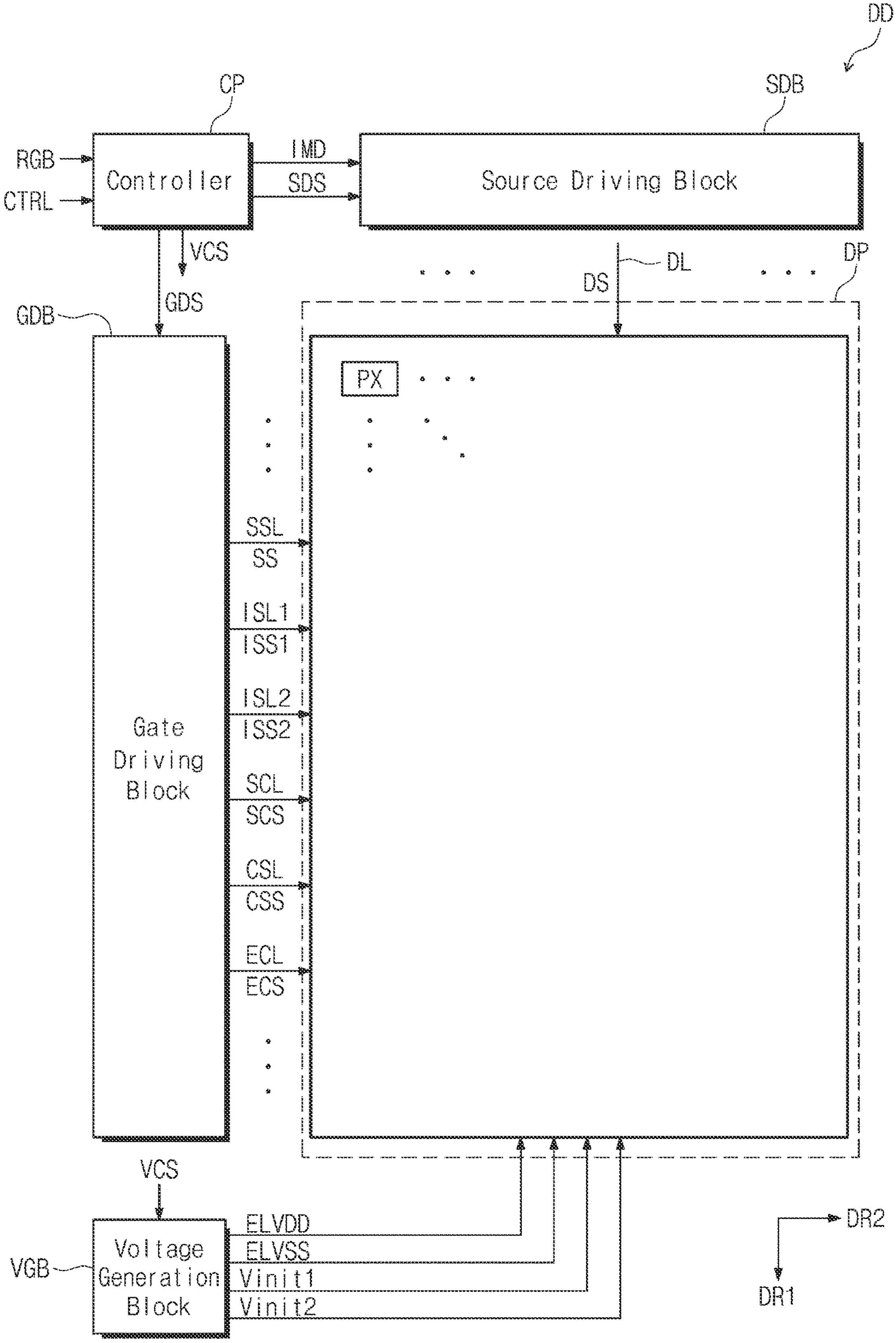
FIG. 2 is a block diagram of a display device according to an embodiment of the present disclosure.

FIG. 2 is a block diagram of a display device according to an embodiment of the present disclosure.

Referring to FIG. 2, the display device DD may include a display panel DP, a controller CP, a source driving block SDB, a gate driving block GDB, and a voltage generation block VGB.

According to an embodiment of the present disclosure, the display panel DP may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and a quantum rod. The following description will be made that the display panel DP is an organic light emitting display panel, according to the present embodiment.

As an example of the present disclosure, the display panel DP includes a plurality of pixels PX, a plurality of scan lines SSL, a plurality of first initialization scan lines ISL1, a plurality of second initialization scan lines ISL2, a plurality of shared control lines SCL, a plurality of compensation scan lines CSL, a plurality of light emitting control lines ECL, and a plurality of data lines DL.

The scan lines SSL, the first initialization scan lines ISL1, the second initialization scan lines ISL2, the shared control lines SCL, the compensation scan lines CSL, and the light emitting control lines ECL respectively extend from the gate driving block GDB in the second direction DR2 and are arranged to be spaced apart from one another in the first direction DR1. The data lines DL extend from the source driving block SDB in the first direction DR1 and are arranged to be spaced from each other in the second direction DR2.

Each of the pixels PX is electrically connected to a corresponding one of the scan lines SSL, a corresponding one of the first initialization scan lines ISL1, a corresponding one of the second initialization scan lines ISL2, a corresponding one of the shared control lines SCL, a corresponding one of the compensation scan lines CSL, and a corresponding one of the light emitting control lines ECL. Also, each of the pixels PX is electrically connected to a corresponding one of the data lines DL. However, depending on a configuration of a driving circuit of the pixels PX, connection relationships between the pixels PX and the scan lines SSL, the pixels PX and the first initialization scan lines ISL1, the pixels PX and the second initialization scan lines ISL2, the pixels PX and the shared control lines SCL, the pixels PX and the compensation scan lines CSL, the pixels PX and the light emitting control lines ECL, and the pixels PX and the data lines DL may be changed.

Each of the pixels PX may include a light emitting device ED (refer to FIG. 3) that generates color light. For example, the pixels PX may include red pixels generating red color light, green pixels generating green color light, and blue pixels generating blue color light. A light emitting device of a red pixel, a light emitting device of a green pixel, and a light emitting device of a blue pixel may include emission layers of different materials. As an example of the present disclosure, each of the pixels PX may include white pixels generating white color light.

The controller CP receives an image signal RGB and a control signal CTRL. The controller CP generates image data IMD by converting the data format of the image signal RGB so as to be suitable for the interface specification with the source driving block SDB. The controller CP generates a source driving signal SDS, a gate control signal GDS, and a voltage control signal VCS based on the control signal CTRL. As an example of the present disclosure, the control signal CTRL may include a vertical synchronization signal, a horizontal synchronization signal, a main clock, and the like.

The controller CP provides the image data IMD and the source driving signal SDS to the source driving block SDB. The source driving signal SDS may include a horizontal start signal for starting an operation of the source driving block SDB. In response to the source driving signal SDS, the source driving block SDB generates a data signal DS based on the image data IMD. The source driving block SDB outputs the data signal DS to the plurality of data lines DL. The data signal DS may be an analog voltage corresponding to a grayscale value of the image data IMD.

The controller CP transmits the voltage control signal VCS to the voltage generation block VGB. The voltage generation block VGB generates voltages necessary for an operation of the display panel DP based on the voltage control signal VCS. As an example of the present disclosure, the voltage generation block VGB generates a first power supply voltage ELVDD, a second power supply voltage ELVSS, a first initialization voltage Vinit1, and a second initialization voltage Vinit2. As an example of the present disclosure, a voltage level of the first power supply voltage ELVDD is greater than a voltage level of the second power supply voltage ELVSS. As an example of the present disclosure, a voltage level of the first power supply voltage ELVDD may be approximately 4V to 7V. A voltage level of the second power supply voltage ELVSS may be approximately 0V to −3V. A voltage level of the first initialization voltage Vinit1 may be approximately −3.5V to −5V. A voltage level of the second initialization voltage Vinit2 may be approximately −3.5V to −5V. As an example of the present disclosure, a voltage level of the first initialization voltage Vinit1 may be the same as a voltage level of the second initialization voltage Vinit2. However, the present disclosure is not limited thereto, and voltage levels of the first power supply voltage ELVDD, the second power supply voltage ELVSS, the first initialization voltage Vinit1, and the second initialization voltage Vinit2, which are generated by the voltage generation block VGB may be changed depending on a configuration of the driving circuit of the pixels PX or characteristics of the light emitting device ED included in each of the pixels PX.

The voltage generation block VGB applies the first power supply voltage ELVDD, the second power supply voltage ELVSS, the first initialization voltage Vinit1, and the second initialization voltage Vinit2 to the display panel DP.

The controller CP transmits the gate control signal GDS to the gate driving block GDB. The gate driving block GDB generates a plurality of driving signals SS, ISS1, ISS2, SCS, CSS, and ECS based on the gate control signal GDS.

The driving signals include a plurality of scan signals SS, a plurality of first initialization scan signals ISS1, a plurality of second initialization scan signals ISS2, a plurality of shared control signals SCS, a plurality of compensation scan signals CSS, and a plurality of light emitting control signals ECS.

The gate driving block GDB outputs the scan signals SS to the scan lines SSL, respectively. The gate driving block GDB outputs the first initialization scan signals ISS1 to the first initialization scan lines ISL1, respectively. The gate driving block GDB outputs the second initialization scan signals ISS2 to the second initialization scan lines ISL2, respectively. The gate driving block GDB outputs the shared control signals SCS to the shared control lines SCL, respectively. The gate driving block GDB outputs the compensation scan signals CSS to the compensation scan lines CSL, respectively.

As an example of the present disclosure, the gate driving block GDB may be embedded in the display panel DP. In detail, the gate driving block GDB may be directly formed on the display panel DP through a thin film process of forming the pixels PX on the display panel DP.

Figure 3:
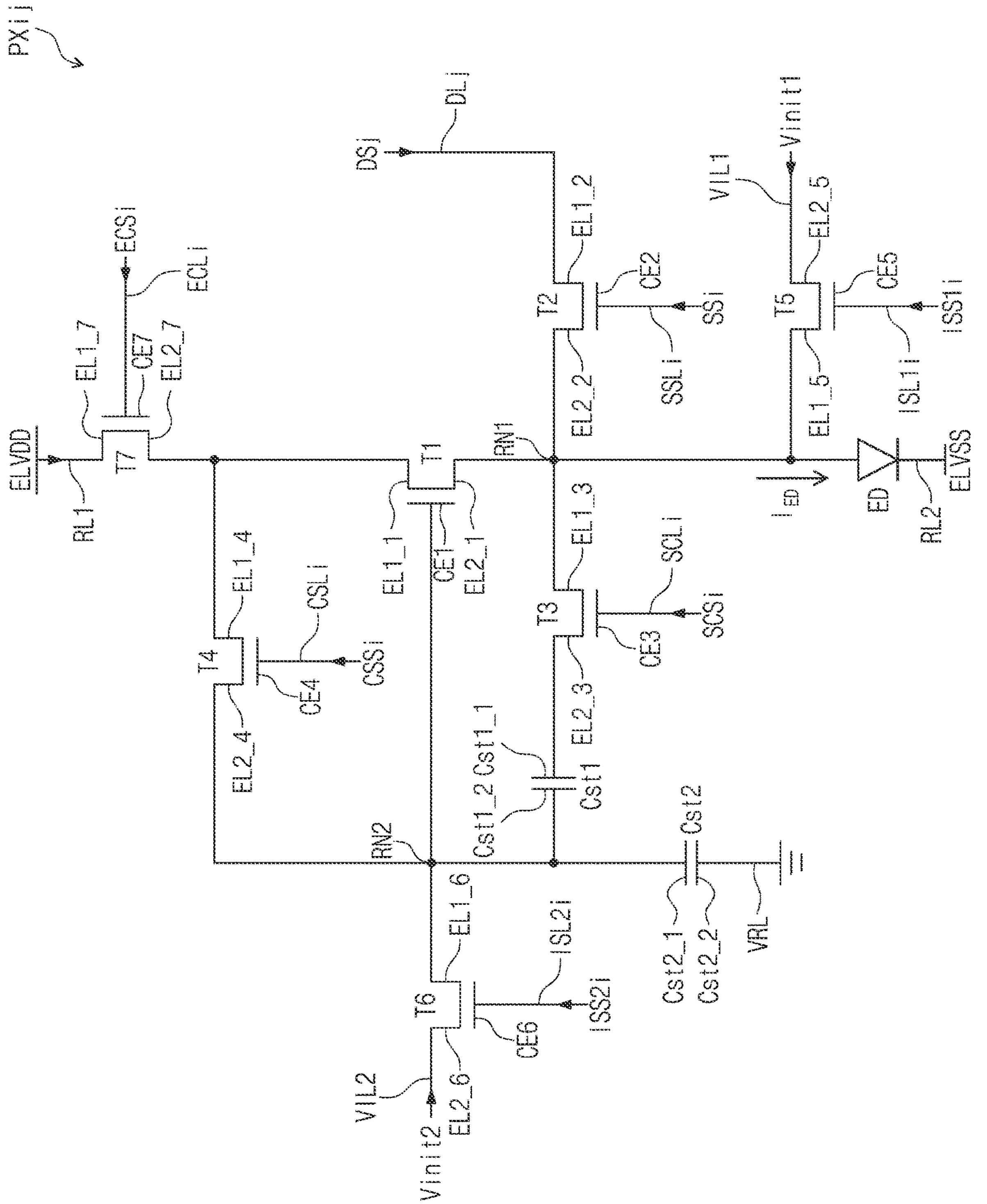
FIG. 3 is a circuit diagram of a pixel according to an embodiment of the present disclosure.

FIG. 3 is a circuit diagram of a pixel according to an embodiment of the present disclosure.

Referring to FIGS. 2 and 3, in FIG. 3, a pixel PXij connected to an i-th scan line SSLi and a j-th data line DLj among the plurality of pixels PX included in the display panel DP is illustrated by way of example.

Referring to FIGS. 2 and 3, each of the pixels PX is connected to a first power line RL1, a second power line RL2, a first initialization power line VIL1, and a second initialization power line VIL2, and a reference voltage line VRL. The first power line RL1 receives the first power supply voltage ELVDD from the voltage generation block VGB. The second power line RL2 receives the second power supply voltage ELVSS from the voltage generation block VGB. The first initialization power line VIL1 receives the first initialization voltage Vinit1 from the voltage generation block VGB. The second initialization power line VIL2 receives the second initialization voltage Vinit2 from the voltage generation block VGB.

As an example of the present disclosure, the pixel PXij includes first to seventh transistors T1 to T7, a first capacitor Cst1, a second capacitor Cst2, and the light emitting device ED. As an example of the present disclosure, the first to seventh transistors T1 to T7 may be provided as N-type transistors (n-channel MOSFET). In addition, as an example of the present disclosure, some of the first to seventh transistors T1 to T7 may be provided as N-type transistors (n-channel MOSFET), and the rest may be provided as P-type transistors (p-channel MOSFET). In detail, the third and fourth transistors T3 and T4 among the first to seventh transistors T1 to T7 may be provided as N-type transistors, and the remaining transistors T1, T2, T5, T6 and T7 may be provided as P-type transistors. However, the present disclosure is not limited thereto, and among the first to seventh transistors T1 to T7, the first, third, and fourth transistors T1, T3, and T4 may be provided as N-type transistors, and the rest transistors may be provided as P-type transistors. In this embodiment, for convenience of description, each of the first to seventh transistors T1 to T7 will be described as the N-type transistor.

As an example of the present disclosure, the first to seventh transistors T1 to T7 may be transistors having an oxide semiconductor layer. As an example of the present disclosure, a metal oxide semiconductor may include a crystalline or amorphous oxide semiconductor. For example, the oxide semiconductor may include a mixture of oxides of metals such as zinc (Zn), indium (In), gallium (Ga), tin (Sn), titanium (Ti), and the like. The oxide semiconductors may include indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO), and the like. The present disclosure is not limited thereto, at least one of the first to seventh transistors T1, T2, T3, T4, T5, T6, and T7 may be a transistor having a low-temperature polycrystalline silicon (LTPS) semiconductor layer, and at least one of the first to seventh transistors T1, T2, T3, T4, T5, T6, and T7 may be a transistor having an oxide semiconductor layer. As an example of the present disclosure, the first transistor T1 is a transistor having an oxide semiconductor layer, and the second to seventh transistors T2, T3, T4, T5, T6, and T7 are transistors having the LTPS semiconductor layer.

In the present specification, the terms "a transistor is connected with a signal line" may refer to "any one of a source electrode, a drain electrode, and a gate electrode of the transistor is formed integrally with the signal line, or is connected with the signal line through a connection electrode". Also, the terms "a transistor is electrically connected to another transistor" means that one of a source electrode, a drain electrode, and a gate electrode of the transistor is integrated with one of a source electrode, a drain electrode, and a gate electrode of the other transistor, or is connected to the other transistor through a connection electrode".

Hereinafter, each of the first to seventh transistors T1 to T7 includes a first electrode, a second electrode, and a control electrode.

The first transistor T1 is connected between the first power line RL1 receiving the first power supply voltage ELVDD and a first reference node RN1. A first electrode EL1_1 of the first transistor T1 is electrically connected to the first power line RL1. A second electrode EL2_1 of the first transistor T1 is electrically connected to the first reference node RN1. A control electrode CE1 of the first transistor T1 is electrically connected to a second reference node RN2. Hereinafter, the first transistor T1 may be referred to as the driving transistor T1.

The second transistor T2 is connected between a j-th data line DLj and the first reference node RN1. A first electrode EL1_2 of the second transistor T2 is electrically connected to the j-th data line DLj. A second electrode EL2_2 of the second transistor T2 is electrically connected to the first reference node RN1 to which the second electrode EL2_1 of the driving transistor T1 is connected. In this embodiment, a control electrode CE2 of the second transistor T2 is electrically connected to the i-th scan line SSLi. As an example of the present disclosure, the i-th scan signal SSi may be transferred to the control electrode CE2 of the second transistor T2 through the i-th scan line SSLi. A data signal DSj may be transferred to the second electrode EL2_2 of the second transistor T2 through the j-th data line DLj. Hereinafter, the second transistor T2 may be referred to as the scan transistor T2.

The third transistor T3 is connected between the first reference node RN1 and the first capacitor Cst1. A first electrode EL1_3 of the third transistor T3 is electrically connected to the first reference node RN1 and a second electrode EL2_3 of the third transistor T3 is electrically connected to the first capacitor Cst1. A control electrode CE3 of the third transistor T3 is electrically connected to an i-th shared control line SCLi. As an example of the present disclosure, an i-th shared control signal SCSi may be transferred to the control electrode CE3 of the third transistor T3 through the i-th shared control line SCLi. Hereinafter, the third transistor T3 may be referred to as the shared control transistor T3.

The first capacitor Cst1 is connected between the first reference node RN1 and the second reference node RN2. In detail, the first capacitor Cst1 is connected between the shared control transistor T3 and the second reference node RN2. The first capacitor Cst1 includes a first electrode Cst1_1 connected to the second electrode EL2_3 of the shared control transistor T3 and a second electrode Cst1_2 connected to the second reference node RN2.

The second capacitor Cst2 is connected between the second reference node RN2 and a reference voltage line VRL receiving a reference voltage. The second capacitor Cst2 includes a first electrode Cst2_1 connected to the second reference node RN2 and a second electrode Cst2_2 connected to the reference voltage line VRL. As an example of the present disclosure, the reference voltage may be a ground voltage.

The fourth transistor T4 is connected between the first power line RL1 and the second reference node RN2. A first electrode EL1_4 of the fourth transistor T4 is electrically connected to the first power line RL1 through a seventh transistor T7 and the first electrode EL1_1 of the driving transistor T1. A second electrode EL2_4 of the fourth transistor T4 is electrically connected to the second reference node RN2. A control electrode CE4 of the fourth transistor T4 may be electrically connected to an i-th compensation scan line CSLi. As an example of the present disclosure, an i-th compensation scan signal CSSi may be transferred to the control electrode CE4 of the fourth transistor T4 through the i-th compensation scan line CSLi. Hereinafter, the fourth transistor T4 may be referred to as the compensation transistor T4. In this embodiment, the compensation transistor T4 may include a plurality of gates. Since the compensation transistor T4 has the plurality of gates, a leakage current of the pixel PXij may be reduced.

The fifth transistor T5 is connected between the first initialization line VIL1 receiving the first initialization voltage Vinit1 and the first reference node RN1. A first electrode EL1_5 of the fifth transistor T5 is electrically connected to the first reference node RN1. A second electrode EL2_5 of the fifth transistor T5 is electrically connected to the first initialization line VIL1. A control electrode CE5 of the fifth transistor T5 may be electrically connected to an i-th first initialization scan line ISL1*i*. As an example of the present disclosure, an i-th first initialization scan signal ISS1*i* may be transferred to the control electrode CE5 of the fifth transistor T5 through the i-th first initialization scan line ISL1*i*. Hereinafter, the fifth transistor T5 may be referred to as the first initialization transistor T5.

The sixth transistor T6 is connected between the second reference node RN2 and a second initialization line VIL2 that receives the second initialization voltage Vinit2. A first electrode EL1_6 of the sixth transistor T6 is electrically connected to the second reference node RN2. A second electrode EL2_6 of the sixth transistor T6 is electrically connected to the second initialization line VIL2. A control electrode CE6 of the sixth transistor T6 may be electrically connected to an i-th second initialization scan line ISL2*i*. As an example of the present disclosure, an i-th second initialization scan signal ISS2*i* may be transferred to the control electrode CE6 of the sixth transistor T6 through the i-th second initialization scan line ISL2*i*. Hereinafter, the sixth transistor T6 may be referred to as the second initialization transistor T6.

The seventh transistor T7 is connected between the first power line RL1 and the driving transistor T1. A first electrode EL1_7 of the seventh transistor T7 is electrically connected to the first power line RL1. A second electrode EL2_7 of the seventh transistor T7 is electrically connected to the first electrode EL1_1 of the driving transistor T1. A control electrode CE7 of the seventh transistor T7 may be electrically connected to an i-th light emitting control line ECLi. An i-th light emitting control signal ECSi may be transferred to the control electrode CE7 of the seventh transistor T7 through the i-th light emitting control line ECLi. Hereinafter, the seventh transistor T7 may be referred to as the light emitting control transistor T7. As an example of the present disclosure, the i-th light emitting control signal ECSi provided to the i-th light emitting control line ECLi may be the same signal as the i-th shared control signal SCSi provided to the i-th shared control line SCLi.

The light emitting device ED is connected between the first reference node RN1 and the second power line RL2 receiving the second power supply voltage ELVSS. The light emitting device ED receives a driving current $I_{ED}$ flowing through the driving transistor T1 to emit light.

FIGS. 4A to 4D are circuit diagrams for describing an operation of a pixel, according to an embodiment of the present disclosure. FIG. 5 is a waveform diagram of driving signals for driving a pixel illustrated in FIG. 3. Hereinafter, components and signals that are the same as the components and signals described with reference to FIG. 3 are marked by the same reference signs, and thus, additional description will be omitted to avoid redundancy.

Referring to FIGS. 2 and 5, the gate driving block GDB sequentially transmits the scan signals SS, the first initialization scan signals ISS1, the second initialization scan signals ISS2, the shared control signals SCS, the compensation scan signals CSS, and the light emitting control signals ECS to the display panel DP. Each of the scan signals SS, the first initialization scan signals ISS1, the second initialization scan signals ISS2, the shared control signals SCS, the compensation scan signals CSS, and the light emitting control signals ECS may have a high level during some section and a low level during some section. In this case, when the corresponding signal has a high level, the N-type transistors are turned on, and when the corresponding signal has a low level, the P-type transistors are turned on. Hereinafter, a case in which the transistors T1 to T7 included in the pixel PXij are the N-type transistors will be described with reference to FIGS. 3 to 4D.

Figure 4A:
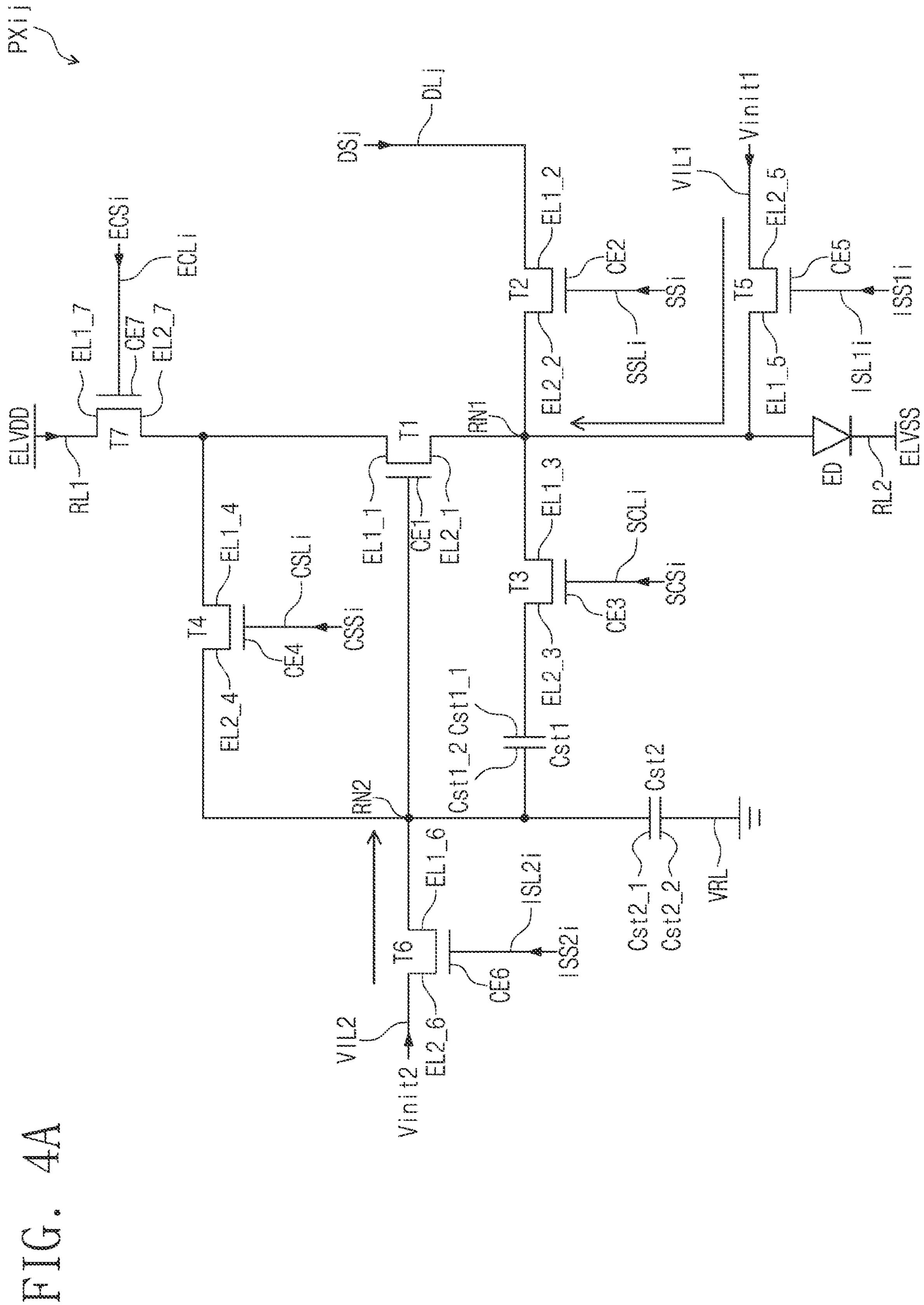
FIGS. 4A, 4B, 4C and 4D are circuit diagrams for describing an operation of a pixel, according to an embodiment of the present disclosure.
Figure 5:
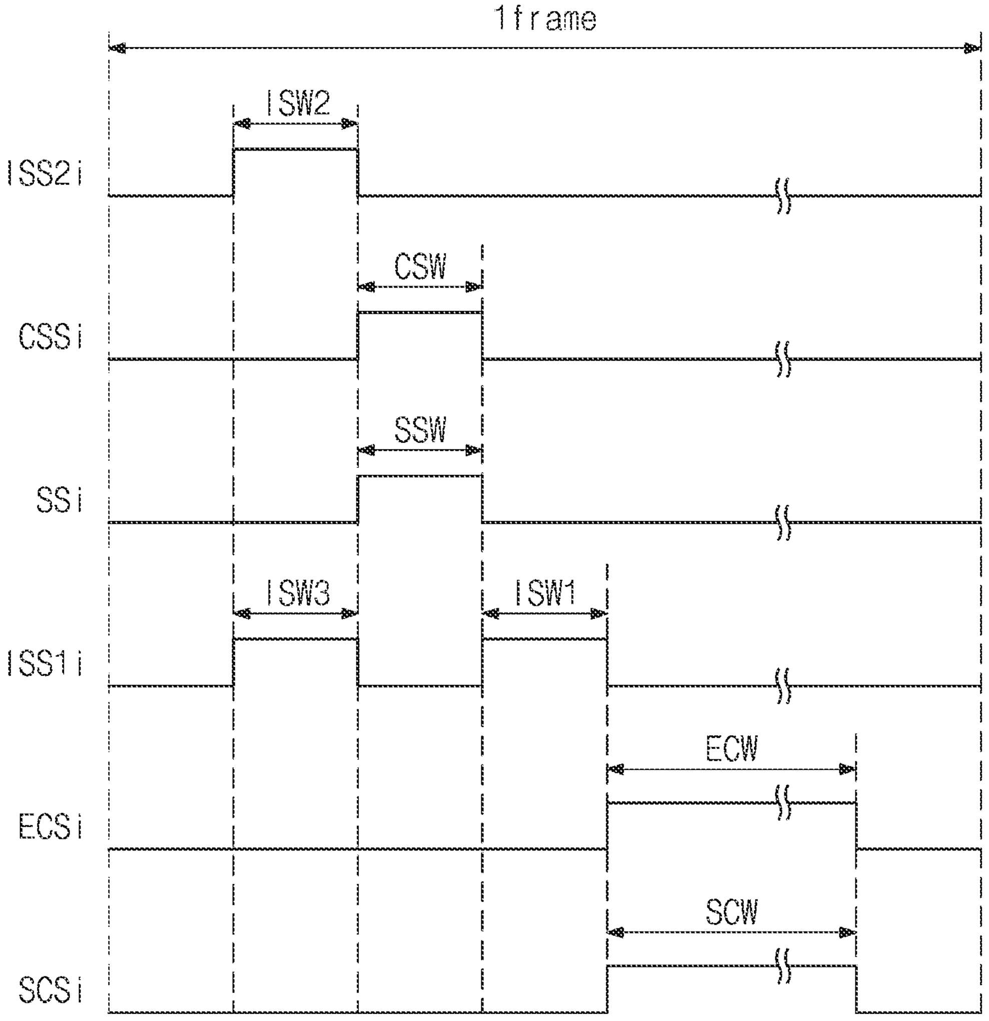
FIG. 5 is a waveform diagram of driving signals for driving a pixel illustrated in FIG. 3.

Referring to FIGS. 4A and 5, when a section in which the i-th second initialization scan signal ISS2*i* has a high level within one frame is referred to as a second initialization section ISW2, the second initialization transistor T6 is turned on during the second initialization section ISW2. When the second initialization transistor T6 is turned on, the second initialization voltage Vinit2 is transferred to the second reference node RN2 through the second initialization transistor T6. Accordingly, the second reference node RN2 is initialized to the second initialization voltage Vinit2, and the control electrode CE1 of the driving transistor T1 electrically connected to the second reference node RN2 is also initialized to the second initialization voltage Vinit2.

Within one frame, the i-th first initialization scan signal ISS1*i* includes a first initialization section ISW1 and a third initialization section ISW3, which have a high level. During the third initialization section ISW3, the first initialization transistor T5 is turned on. When the first initialization transistor T5 is turned on, the first initialization voltage Vinit1 is transferred to the first reference node RN1 through the first initialization transistor T5. Accordingly, the first reference node RN1 is initialized to the first initialization voltage Vinit1, and the second electrode EL2_1 of the driving transistor T1 and an anode of the light emitting device ED, which are electrically connected to the first reference node RN1 are also initialized to the first initialization voltage Vinit1.

Figure 4B:
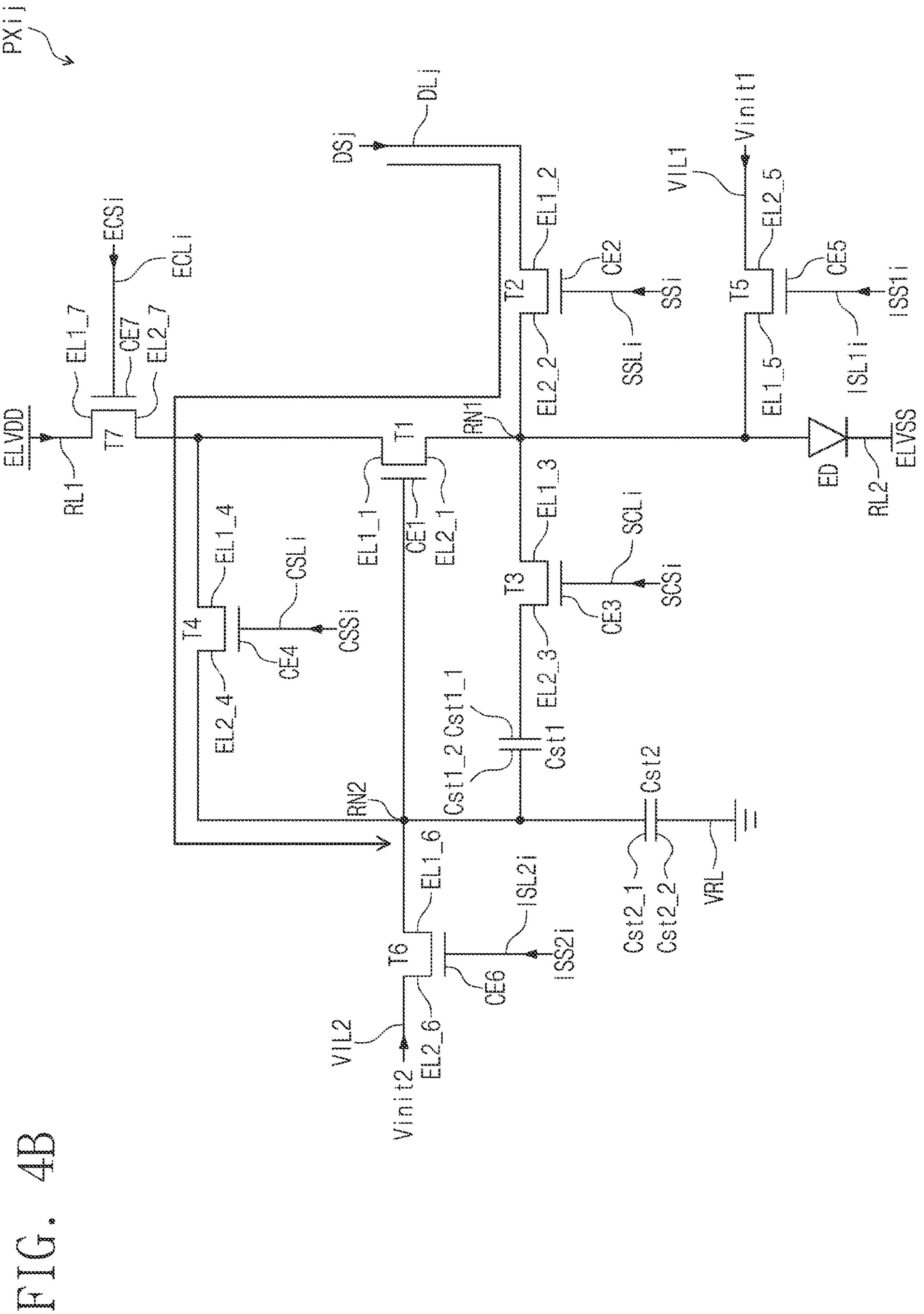

Referring to FIGS. 4B and 5, within one frame, the i-th scan signal SSi includes a scan section SSW having a high level. During the scan section SSW, the scan transistor T2 is turned on. When the scan transistor T2 is turned on, the data signal DSj is transferred to the first reference node RN1 through the scan transistor T2. Accordingly, the data signal DSj is transferred to the second electrode EL2_1 of the driving transistor T1 electrically connected to the first reference node RN1.

Within one frame, the i-th compensation scan signal CSSi includes a compensation section CSW having a high level. During the compensation section CSW, the compensation transistor T4 is turned on. When the compensation transistor T4 is turned on, the driving transistor T1 is diode-connected by the compensation transistor T4 turned on and is forward-biased.

As an example of the present disclosure, the scan section SSW and the compensation section CSW may overlap each other within one frame. In this case, the compensation voltage ($Ds_j$−Vth) which is reduced by a level of a threshold voltage Vth of the driving transistor T1 from a potential included in the data signal DSj applied to the second electrode EL2_1 of the driving transistor T1 is applied to the first electrode EL1_1 and the control electrode CE1 of the driving transistor T1 through the compensation transistor T4. In this case, the compensation voltage ($Ds_j$−Vth) and the ground voltage may be respectively applied to both ends of the second capacitor Cst2, and charges corresponding to a voltage difference ($Ds_j$−Vth) between the both ends of the second capacitor Cst2 may be stored in the second capacitor Cst2.

As an example of the present disclosure, within one frame, the second initialization section ISW2 and the third initialization section ISW3 may precede the scan section SSW and the compensation section CSW, and the first initialization section ISW1 may follow the scan section SSW and the compensation section CSW.

Figure 4C:
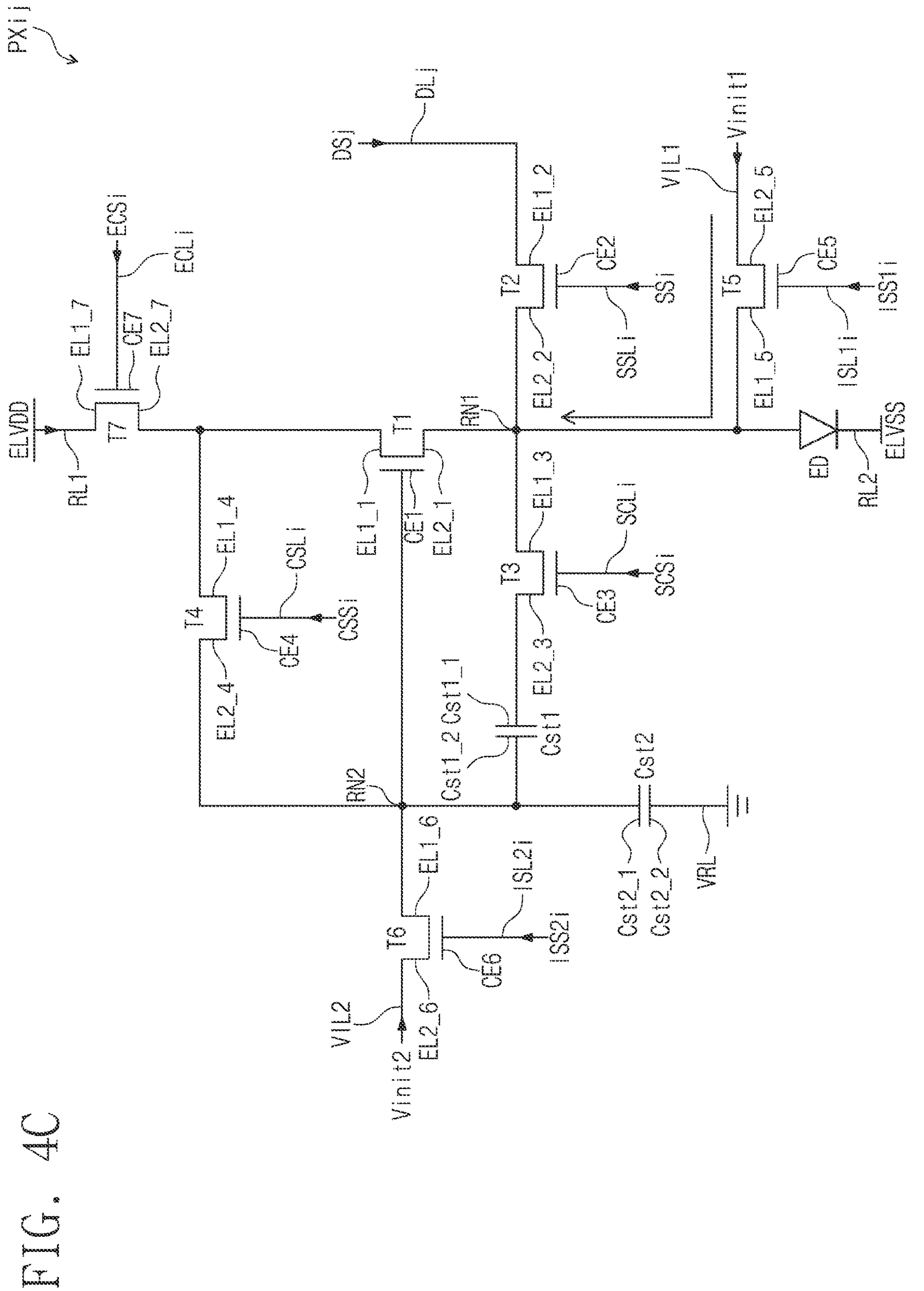

Referring to FIGS. 4C and 5, the first initialization transistor T5 is turned on during the first initialization section ISW1. When the first initialization transistor T5 is turned on, the first initialization voltage Vinit1 is transferred to the first reference node RN1 through the first initialization transistor T5. Accordingly, the first initialization voltage Vinit1 may be provided to the first reference node RN1 to which the data signal DSj was provided through the scan transistor T2.

Figure 4D:
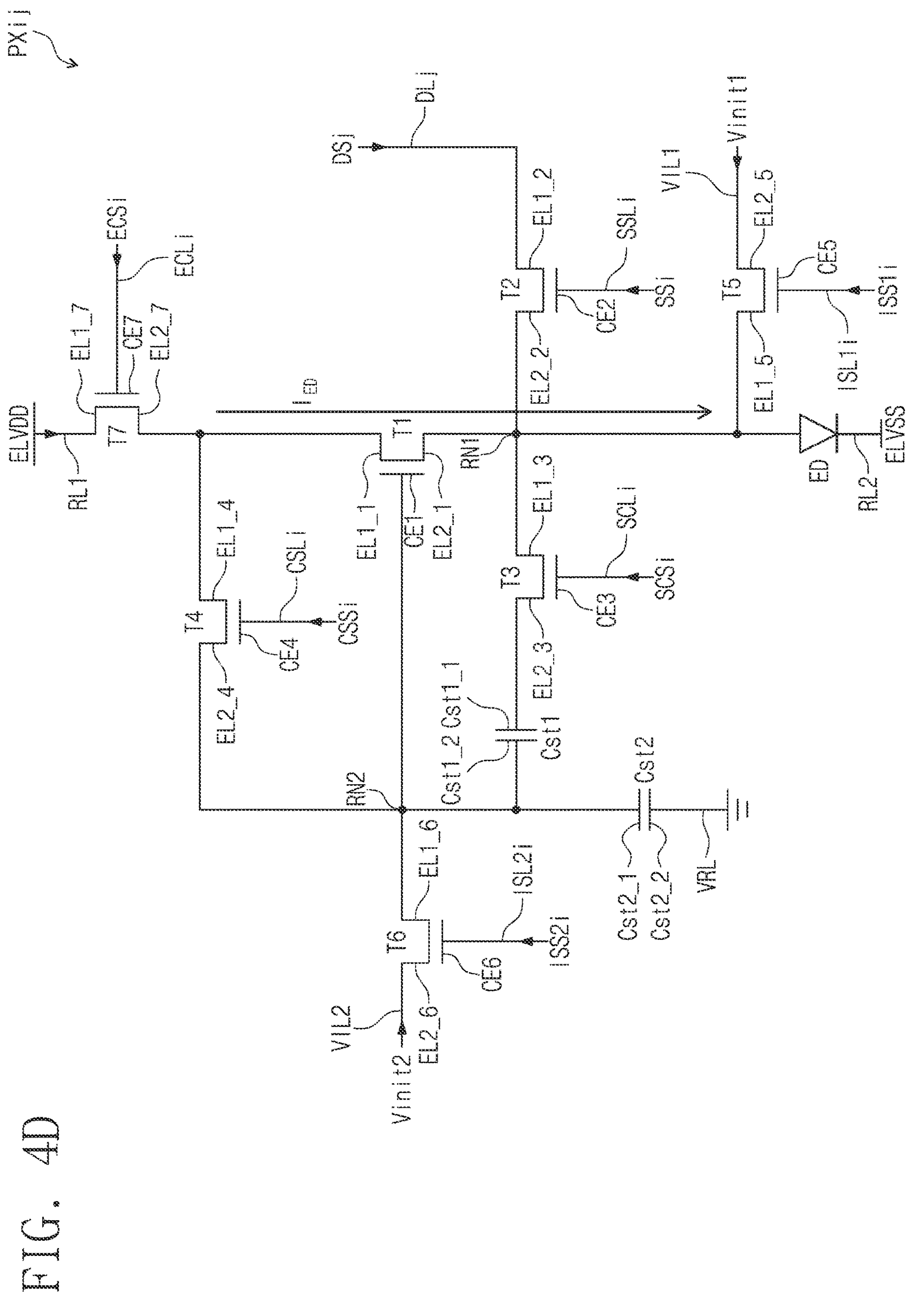

Referring to FIGS. 4D and 5, when the section in which the i-th light emitting control signal ECSi has a high level within one frame is referred to as the light emitting section ECW, the light emitting control transistor T7 is turned on during the light emitting section ECW. When the light emitting control transistor T7 is turned on, the first power supply voltage ELVDD is applied to the first electrode EL1_1 of the driving transistor T1 through the light emitting control transistor T7. In this case, the driving current $I_{ED}$ depending on a difference between a potential of the first electrode EL1_1 of the driving transistor T1 and a potential of the control electrode CE1 of the driving transistor T1 is generated through the driving transistor T1. The driving current $I_{ED}$ is transferred to the light emitting device ED through the driving transistor T1. The light emitting device ED receives the driving current $I_{ED}$ and emits light. In this case, during a section in which the seventh transistor T7 is turned on, a potential of the control electrode CE1 of the driving transistor T1 that causes the driving transistor T1 to have a turn-on state may be maintained through charges stored in the second capacitor Cst2. As an example of the present disclosure, the light emitting section ECW may follow the first initialization section ISW1 within one frame.

In addition, within one frame, when a section in which the i-th shared control signal SCSi has a high level is referred to as a shared section SCW, the shared control transistor T3 is turned on during the shared section SCW. Charges are accumulated into the first reference node RN1 by the driving current $I_{ED}$ flowing through the light emitting control transistor T7 and the driving transistor T1, which are turned on. A potential of the first reference node RN1 in which charges are accumulated by the driving current $I_{ED}$ is referred to as a light emitting voltage $V_{OLED}$ (not illustrated). When the shared control transistor T3 is turned on, the charges accumulated into the first reference node RN1 are distributed by the first and second capacitors Cst1 and Cst2 connected in series with each other, and charges corresponding to $$\frac{C1}{C1+C2}\times V_{OLED}$$

are distributed to the second reference node RN2. Accordingly, the summed charges $$(DS_j - V_{th}) - \left(\frac{C1}{C1-C2}\times V_{OLED}\right)$$

obtained by adding the charges stored in the compensation section CSW and the charges distributed in the shared section SCW are stored in the second capacitor Cst2. According to a current-voltage relationship of the driving transistor T1, the driving current $I_{ED}$ is defined by Equation 1 below.

$$I_{ED} = \frac{1}{2}\alpha\beta\left(DSj - \frac{C2}{C2-C1}V_{OLED}\right)^2, \qquad \text{[Equation 1]}$$

where, 'α' is a constant corresponding to an area and a length of a semiconductor layer included in the driving transistor T1, 'β' indicates mobility characteristics of the driving transistor T1, and C1 is a capacitance of the first capacitor Cst1, C2 is a capacitance of the second capacitor Cst2, $V_{OLED}$ is a light emitting voltage, and DSj is the data signal. As an example of the present disclosure, the shared section SCW may follow the first initialization section ISW1 within one frame. Within one frame, the shared section SCW may overlap the light emitting section ECW.

In this case, when the mobility 'β' of the driving transistor T1 increases, an amount of the current flowing through the driving transistor T1 increases, and accordingly, as an amount of charges accumulated into the first reference node RN1 increases, a level of the light emitting voltage $V_{OLED}$ also increases. Accordingly, the amount of the driving current $I_{ED}$ is reduced. In contrast, when the mobility 'β' of the driving transistor T1 decreases, an amount of the current flowing through the driving transistor T1 decreases, and accordingly, as an amount of charges accumulated into the first reference node RN1 decreases, a level of the light emitting voltage $V_{OLED}$ also decreases. Accordingly, the amount of the driving current $I_{ED}$ increases. Accordingly, the present disclosure may maintain reliability of the display quality of the image IM (refer to FIG. 1) displayed on the display panel DP (refer to FIG. 2) regardless of a change in mobility of the driving transistor T1, by allowing the magnitude of the mobility 'β' of the driving transistor T1 and the amount of the driving current $I_{ED}$ to be determined through a negative feedback.

In addition, since the driving current $I_{ED}$ of the present disclosure is determined independently of the threshold voltage Vth of the driving transistor T1, the reliability of the display quality of the image IM displayed on the display panel DP may be maintained regardless of the threshold voltage Vth of the driving transistor T1.

Figure 6:
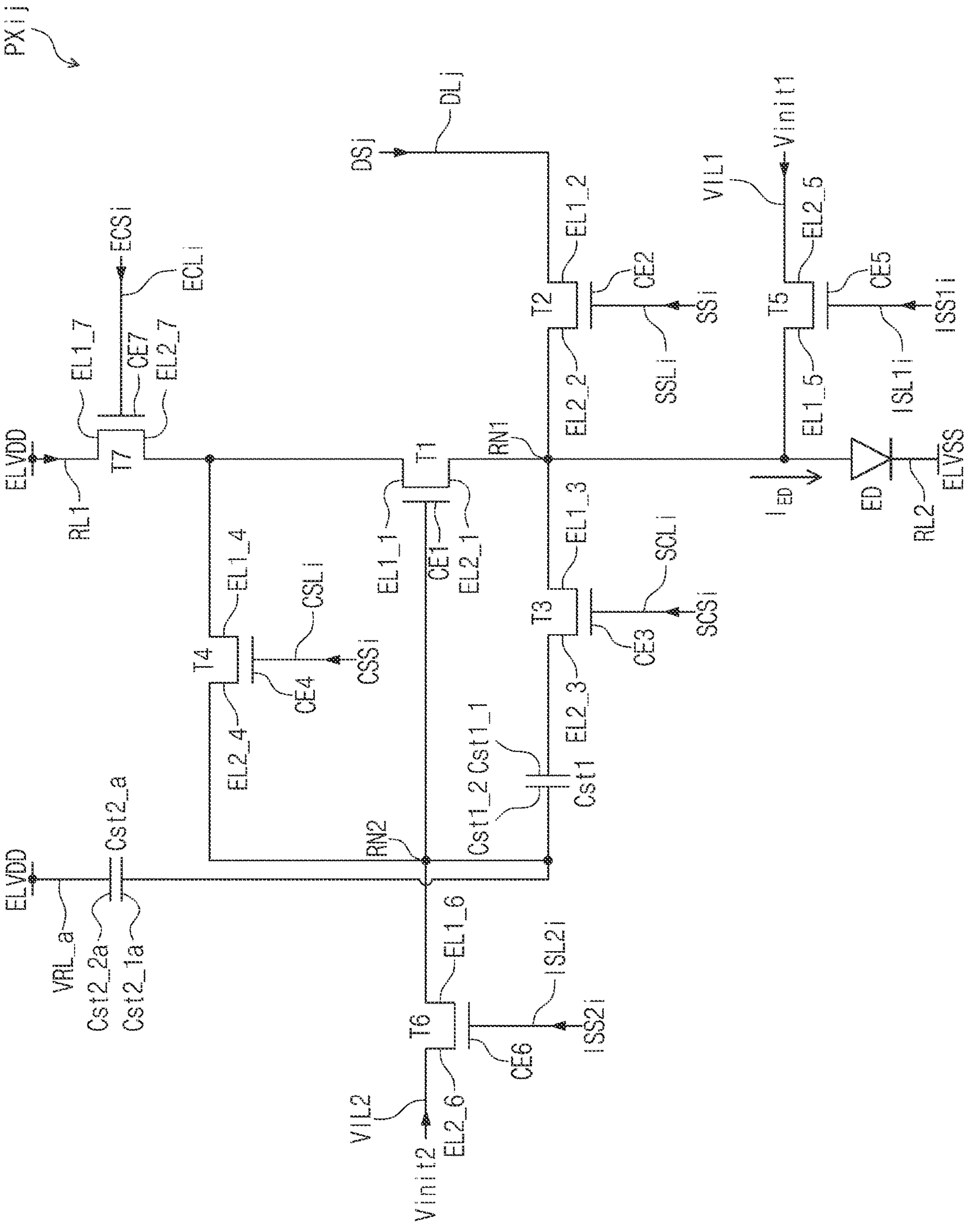
FIG. 6 is a circuit diagram of a pixel according to an embodiment of the present disclosure.

FIG. 6 is a circuit diagram of a pixel according to an embodiment of the present disclosure. Hereinafter, components and signals that are the same as the components and signals described with reference to FIGS. 3 to 5 are marked by the same reference signs, and thus, additional description will be omitted to avoid redundancy.

Referring to FIG. 6, the first capacitor Cst1 is connected between the shared control transistor T3 and the second reference node RN2. The first capacitor Cst1 includes the first electrode CSt1_1 connected to the second electrode EL2_3 of the shared control transistor T3 and the second electrode Cst1_2 connected to the second reference node RN2.

A second capacitor Cst2_*a* is connected between the second reference node RN2 and a reference voltage line VRL_a receiving a reference voltage. As an example of the present disclosure, the reference voltage may be the first power supply voltage ELVDD. The second capacitor Cst2_*a* includes a first electrode Cst2_1*a* connected to the second reference node RN2 and a second electrode Cst2_2*a* connected to the reference voltage line VRL_a.

Referring to FIGS. 5 and 6, when the second capacitor Cst2_*a* is connected to the reference voltage line VRL a receiving the first power supply voltage ELVDD, charges corresponding to a voltage difference (Dsj−Vth)—ELVDD between both ends of the second capacitor Cst2_*a* may be stored in the second capacitor Cst2_*a* in the scan section SSW and the compensation section CSW. In addition, in the light emitting section ECW and the shared section SCW, charges corresponding to $$\frac{C1}{C1-C2}\times(V_{OLED} - ELVDD)$$

are distributed into the second reference node RN2, and charges corresponding to $$(DS_j - V_{th}) - ELVDD - \frac{C1}{C1-C2}\times(V_{OLED} - ELVDD)$$

are stored in the second capacitor Cst2_a.

In this case, according to a current-voltage relationship of the driving transistor T1, the driving current $I_{ED}$ is defined by Equation 2 below.

$$I_{ED} = \frac{1}{2}\alpha\beta\left(DS_j - \frac{C2}{C1 - C2}V_{OLED} - i1 - \frac{C1}{C1 - C2}ELVDD\right)^2, \quad \text{[Equation 2]}$$

where, 'α' is a constant corresponding to an area and a length of a semiconductor layer included in the driving transistor T1, 'β' indicates mobility characteristics of the driving transistor T1, and C1 is a capacitance of the first capacitor Cst1, C2 is a capacitance of the second capacitor Cst2_a, $V_{OLED}$ is a light emitting voltage, ELVDD is the first power supply voltage, and DSj is the data signal.

However, the present disclosure is not limited thereto, and the reference voltage may be any one of the second power supply voltage ELVSS, the first initialization voltage Vinit1, and the second initialization voltage Vinit2. In this case, an amount of the charges stored in the second capacitor Cst2_a and an amount of the driving current $I_{ED}$ may vary depending on the types and corresponding levels of the reference voltage applied to the reference voltage line VRL_a.

Figure 7:
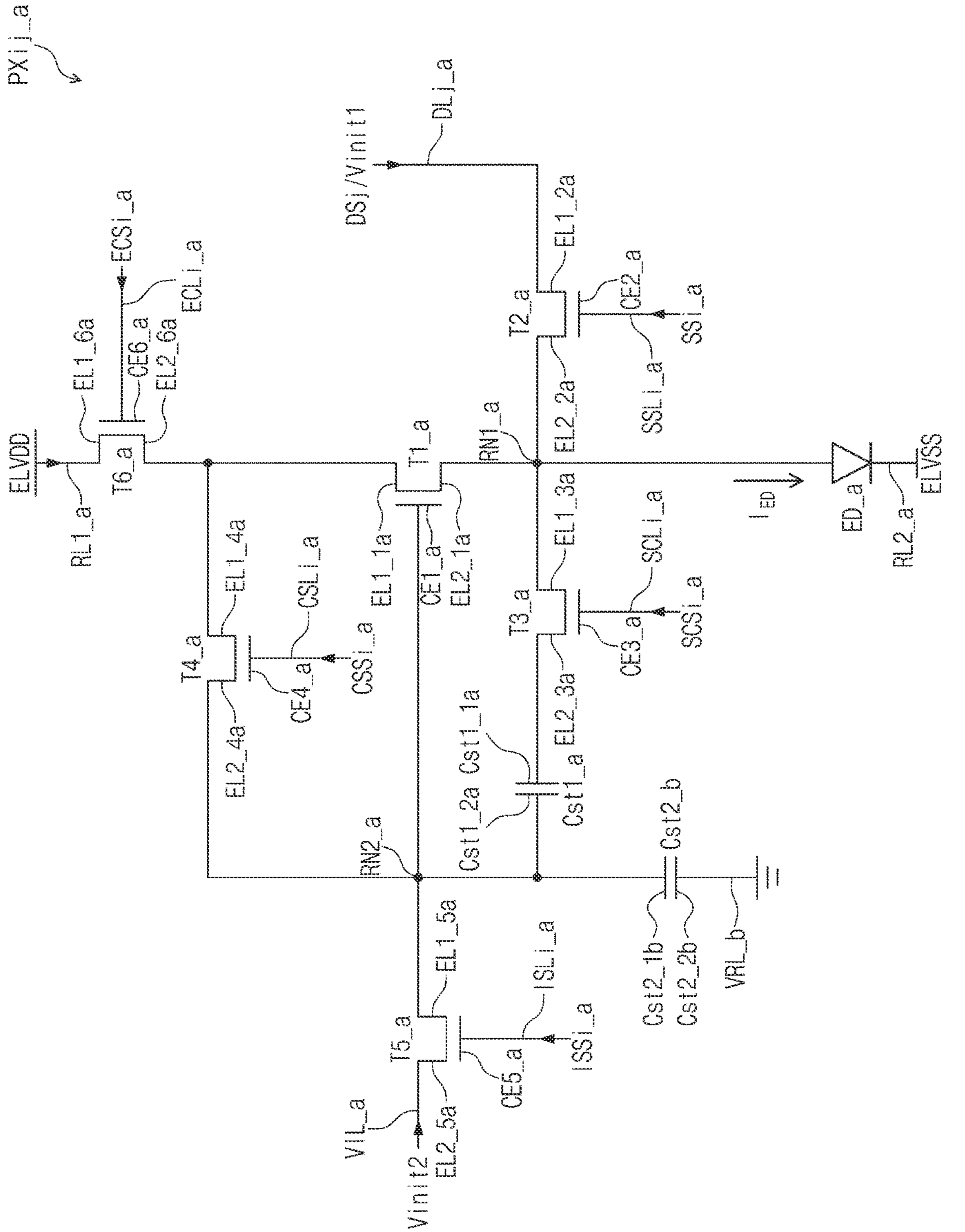
FIG. 7 is a circuit diagram of a pixel according to an embodiment of the present disclosure.
Figure 8:
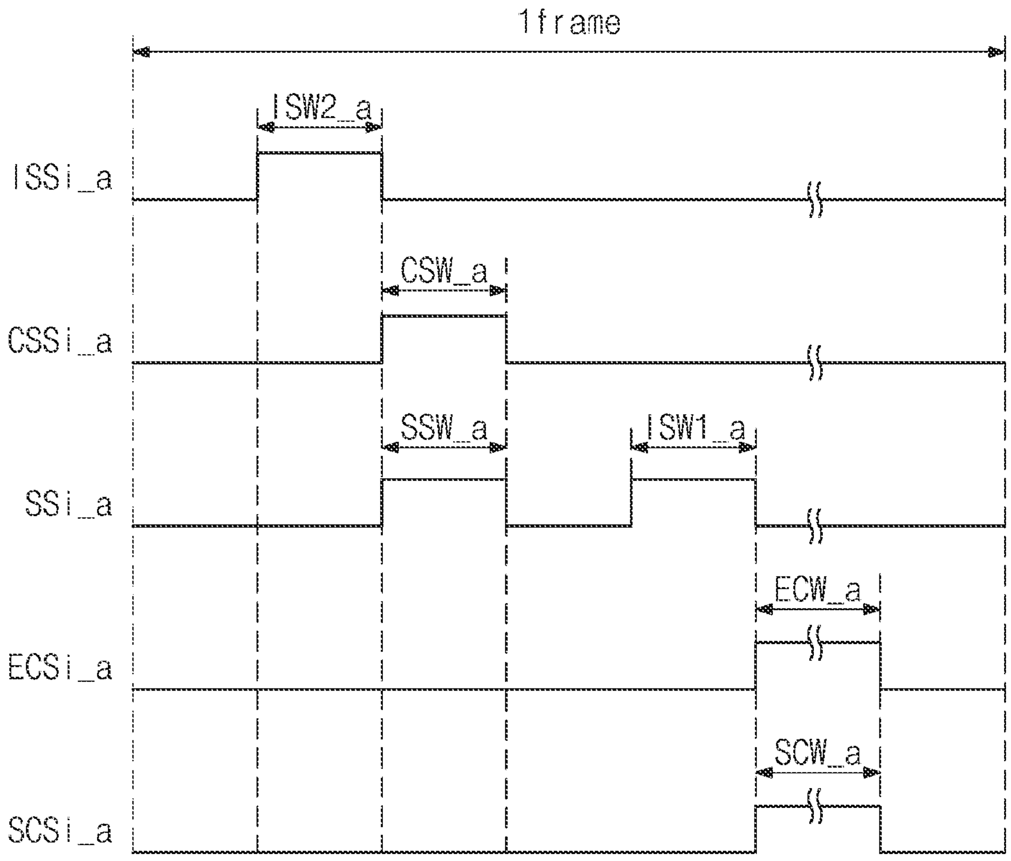
FIG. 8 is a waveform diagram of driving signals for driving a pixel illustrated in FIG. 7.

FIG. 7 is a circuit diagram of a pixel according to an embodiment of the present disclosure. FIG. 8 is a waveform diagram of driving signals for driving a pixel illustrated in FIG. 7.

Referring to FIG. 7, the pixel PXij_a includes first to sixth transistors T1_a to T6_a, a first capacitor Cst1_a, a second capacitor Cst2_b, and a light emitting device ED_a. In this embodiment, for convenience of description, each of the first to sixth transistors T1_a to T6_a will be described as the N-type transistor. Hereinafter, each of the first to sixth transistors T1_a to T6_a includes a first electrode, a second electrode, and a control electrode.

The first transistor T1_a is connected between a first power line RL1_a receiving the first power supply voltage ELVDD and a first reference node RN1_a. A first electrode EL1_1a of the first transistor T1_a is electrically connected to the first power line RL1_a. A second electrode EL2_1_a of the first transistor T1_a is electrically connected to the first reference node RN1_a. A control electrode CE1_a of the first transistor T1_a is electrically connected to a second reference node RN2_a. Hereinafter, the first transistor T1_a may be referred to as the driving transistor T1_a.

The second transistor T2_a is connected between a j-th data line DLj_a and the first reference node RN1_a which is connected to the second electrode EL2_1a of the driving transistor T1_a. A first electrode EL1_2a of the second transistor T2_a is electrically connected to the j-th data line DLj_a. A second electrode EL2_2a of the second transistor T2_a is electrically connected to the first reference node RN1_a. which is connected to the second electrode EL2_1a of the driving transistor T1_a. In an embodiment, a control electrode CE2_a of the second transistor T2_a is electrically connected to an i-th scan line SSLi_a to which an i-th scan signal SSi_a is applied. The data signal DSj may be transferred to the second electrode EL2_2a of the second transistor T2_a through the j-th data line DLj_a. Also, the first initialization signal Vinit1 may be transferred to the second electrode EL2_2a of the second transistor T2_a through the j-th data line DLj_a. An operation in which the data signal DSj or the first initialization signal Vinit1 is transferred to the second electrode EL2_2a of the second transistor T2_a through the j-th data line DLj_a will be described later in the description of FIG. 8. Hereinafter, the second transistor T2_a may be referred to as the scan transistor T2_a.

The third transistor T3_a is connected between the first reference node RN1_a and the first capacitor Cst1_a. A first electrode EL1_3a of the third transistor T3_a is electrically connected to the first reference node RN1_a, and a second electrode EL2_3a of the third transistor T3_a is electrically connected to the first capacitor Cst1_a. A control electrode CE3_a of the third transistor T3_a is electrically connected to an i-th shared control line SCLi_a to which an i-th shared control signal SCSi_a is applied. As an example of the present disclosure, the i-th shared control signal SCSi_a may be transferred to the control electrode CE3_a of the third transistor T3_a through the i-th shared control line SCLi_a. Hereinafter, the third transistor T3_a may be referred to as the shared control transistor T3_a.

The first capacitor Cst1_a is connected between the first reference node RN1_a and the second reference node RN2_a. In detail, the first capacitor Cst1_a includes a first electrode Cst1_1a connected to the second electrode EL2_3a of the shared control transistor T3_a and a second electrode Cst1_2a connected to the second reference node RN2_a.

The second capacitor Cst2_b is connected between the second reference node RN2_a and the reference voltage line VRL_b receiving a reference voltage. The second capacitor Cst2_b includes a first electrode Cst2_1b connected to the second reference node RN2_a and a second electrode Cst2_2b connected to the reference voltage line VRL_b. As an example of the present disclosure, the reference voltage may be a ground voltage.

The fourth transistor T4_a is connected between the first power line RL1_a and the second reference node RN2_a. A first electrode EL1_4a of the fourth transistor T4_a is electrically connected to the first power line RL1_a through the sixth transistor T6_a and the first electrode EL1_1a of the driving transistor T1_a. A second electrode EL2_4a of the fourth transistor T4_a is electrically connected to the second reference node RN2_a. A control electrode CE4_a of the fourth transistor T4_a may be electrically connected to an i-th compensation scan line CSLi_a to which an i-th compensation scan signal CSSi_a is applied. Hereinafter, the fourth transistor T4_a may be referred to as the compensation transistor T4_a. In this embodiment, the compensation transistor T4_a may include a plurality of gates. Since the compensation transistor T4_a has the plurality of gates, a leakage current of the pixel PXij_a may be reduced.

The fifth transistor T5_a is connected between the second reference node RN2_a and an initialization line VIL_a receiving the second initialization voltage Vinit2. A first electrode EL1_5a of the fifth transistor T5_a is electrically connected to the second reference node RN2_a. A second electrode EL2_5a of the fifth transistor T5_a is electrically connected to the initialization line VIL_a. A control electrode CE5_a of the fifth transistor T5_a may be electrically connected to an i-th initialization scan line ISLi_a to which an i-th initialization scan signal ISSi_a is applied. Hereinafter, the fifth transistor T5_a may be referred to as the initialization transistor T5_a.

The sixth transistor T6_a is connected between the first power line RL1_a and the driving transistor T1_a. A first electrode EL1_6a of the sixth transistor T6_a is electrically connected to the first power line RL1_a. A second electrode EL2_6a of the sixth transistor T6_a is electrically connected to the first electrode EL1_a1 of the driving transistor T1_a. A control electrode CE6_a of the sixth transistor T6_a may be electrically connected to an i-th light emitting control line ECLi_a to which an i-th light emitting control signal ECSi_a is applied. Hereinafter, the sixth transistor T6_*a* may be referred to as the light emitting control transistor T6_*a*. As an example of the present disclosure, the i-th light emitting control signal ECSi_a provided to the i-th light emitting control line ECLi_a may be the same signal as the i-th shared control signal SCSi_a provided to the i-th shared control line SCLi_a.

The light emitting device ED_a is connected between the first reference node RN1_*a* and a second power line RL2_*a* receiving the second power supply voltage ELVSS. The light emitting device ED_a receives the driving current $I_{ED}$ flowing through the driving transistor T1_*a* to emit light.

In FIG. 8, signals for driving the pixel PXij_a illustrated in FIG. 7 are illustrated. Hereinafter, additional description of the same operation as that of the pixel PXij described in FIGS. 4A to 5 will be omitted to avoid redundancy.

Referring to FIG. 8, when a section in which the i-th initialization scan signal ISSi_a has a high level within one frame is referred to as a second initialization section ISW2_*a*, the initialization transistor T5_*a* is turned on during the second initialization section ISW2_*a*.

Within one frame, the i-th scan signal SSi_a includes a scan section SSW_a and a first initialization section ISW1_*a*, which have a high level. During the scan section SSW_a, the scan transistor T2_*a* is turned on. During a section overlapping the scan section SSW_a, the data signal DSj is applied to the j-th data line DLj_a. During the scan section SSW_a, the data signal DSj is transferred to the first reference node RN1_*a* through the scan transistor T2_*a*. Accordingly, the data signal DSj is transferred to the second electrode EL2_1*a* of the driving transistor T1_*a* electrically connected to the first reference node RN1_*a*.

As an example of the present disclosure, the data signal DSj is applied to the j-th data line DLj_a during the scan section SSW_a. During the first initialization section ISW1_*a*, the scan transistor T2_*a* is turned on. During a section overlapping the first initialization section ISW1_*a*, the first initialization voltage Vinit1 is applied to the j-th data line DLj_a. As an example of the present disclosure, the first initialization voltage Vinit1 is applied to the j-th data line DLj_a during the first initialization section ISW1_*a*. During the first initialization section ISW1_*a*, the first initialization voltage Vinit1 is transferred to the first reference node RN1_*a* through the scan transistor T2_*a*. Accordingly, the first initialization voltage Vinit1 is applied to the second electrode EL2_1*a* of the driving transistor T1_*a* and the light emitting device ED_a, which are electrically connected to the first reference node RN1_*a*.

Within one frame, the i-th compensation scan signal CSSi_a includes a compensation section CSW_a having a high level. During the compensation section CSW_a, the compensation transistor T4_*a* is turned on.

Within one frame, the i-th light emitting control signal ECSi_a includes a light emitting section ECW_a having a high level. During the light emitting section ECW_a, the light emitting control transistor T6_*a* is turned on.

Within one frame, the i-th shared control signal SCSi_a includes a shared section SCW_a having a high level. During the shared section SCW_a, the shared control transistor T3_*a* is turned on.

Accordingly, like the pixel PXij including the driving circuit illustrated in FIG. 3, the pixel PXij_a including a driving circuit illustrated in FIG. 7 may maintain the reliability of the display quality of the image IM (refer to FIG. 1) displayed on the display panel DP (refer to FIG. 2) regardless of changes in the mobility and in the threshold voltage Vth of the driving transistor T1_*a*.

According to an embodiment of the present disclosure, reliability of display quality of a display device may be maintained regardless of a change in characteristics of a transistor for driving a light emitting device. In detail, the amount of light emitted from the light emitting device may be uniformly maintained regardless of the mobility change of the transistor by determining the amount of current flowing to the light emitting device in response to the mobility of the transistor. In addition, the amount of light emitted from the light emitting device may be uniformly maintained regardless of a change in a threshold voltage of the transistor by determining the amount of the current flowing to the light emitting device regardless of the threshold voltage of the transistor.

As described above, embodiments are disclosed in drawings and specifications. Specific terms are used herein, but are only used for the purpose of describing the present disclosure, and are not used to limit the meaning or the scope of the present disclosure described in claims. Therefore, it may be understood that various modifications and other equivalent embodiments are possible from this point one of ordinary skill in the art. The technical protection scope of the present disclosure is not limited to the detailed description of this specification, but should be defined by the technical spirit of the appended claims.

What is claimed is:

1. A display device comprising:

a display panel including a plurality of pixels, one of the plurality of pixels includes:

a light emitting device connected to a first reference node and emitting light;

a driving transistor connected between a power supply line receiving a power supply voltage and the first reference node;

a scan transistor connected between a data line receiving a data signal and the first reference node, and receiving a scan signal;

a first capacitor connected between the first reference node and a second reference node;

a shared transistor connected between the first reference node and the second reference node and receiving a shared control signal; and a second capacitor connected between the second reference node and a reference voltage line receiving a reference voltage, wherein the first capacitor and the shared transistor are connected in series between the first reference node and the second reference node, and wherein a control electrode of the driving transistor is connected to the second reference node.

2. The display device of claim 1, wherein the reference voltage is a ground voltage.

3. The display device of claim 1, wherein the driving transistor includes a first electrode connected to the power supply line, a second electrode connected to the first reference node, and a control electrode connected to the second reference node, wherein the scan transistor includes a first electrode connected to the data line, a second electrode connected to the first reference node, and a control electrode receiving the scan signal, and wherein the shared transistor includes a first electrode connected to the first reference node, a second electrode connected to the first capacitor, and a control electrode receiving the shared control signal.

4. The display device of claim 3, wherein the first capacitor includes a first electrode connected to the second electrode of the shared transistor and a second electrode connected to the second reference node, and wherein, the second capacitor includes a first electrode connected to the second reference node and a second electrode connected to the reference voltage line.

5. The display device of claim 1, wherein the one of the plurality of pixels further includes:

a compensation transistor connected between the power supply line and the second reference node, and wherein the compensation transistor includes a first electrode connected to the power supply line, a second electrode connected to the second reference node, and a control electrode receiving a compensation scan signal.

6. The display device of claim 5, wherein the one of the plurality of pixels further includes a first initialization transistor connected between a first initialization line receiving a first initialization voltage and the first reference node, and wherein the first initialization transistor includes a first electrode connected to the first reference node, a second electrode connected to the first initialization line, and a control electrode receiving a first initialization scan signal.

7. The display device of claim 6, wherein the one of the plurality of pixels further includes a second initialization transistor connected between a second initialization line receiving a second initialization voltage and the second reference node, and wherein the second initialization transistor includes a first electrode connected to the second reference node, a second electrode connected to the second initialization line, and a control electrode receiving a second initialization scan signal.

8. The display device of claim 7, further comprising:

a light emitting control transistor connected between the power supply line and the driving transistor, and wherein the light emitting control transistor includes a first electrode connected to the power supply line, a second electrode connected to the driving transistor, and a control electrode receiving a light emitting control signal.

9. The display device of claim 8, wherein the scan signal includes a scan section for turning on the scan transistor, wherein the compensation scan signal includes a compensation section for turning on the compensation transistor, and wherein, within one frame, the scan section and the compensation section overlap each other.

10. The display device of claim 9, wherein the first initialization scan signal includes a first initialization section for turning on the first initialization transistor, wherein the second initialization scan signal includes a second initialization section for turning on the second initialization transistor, and wherein, within the one frame, the second initialization section precedes the scan section and the compensation section, and the first initialization section follows the scan section and the compensation section.

11. The display device of claim 10, wherein the first initialization scan signal further includes a third initialization section for turning on the first initialization transistor, and wherein, within the one frame, the third initialization section precedes the scan section and the compensation section.

12. The display device of claim 10, wherein the shared control signal includes a shared section for turning on the shared transistor, and wherein, within the one frame, the shared section follows the first initialization section.

13. The display device of claim 12, wherein the light emitting control signal includes a light emitting section for turning on the light emitting control transistor, and wherein, within the one frame, the light emitting section follows the first initialization section.

14. The display device of claim 13, wherein, within the one frame, the shared section and the light emitting section overlap each other.

15. A display device comprising:

a display panel including a plurality of pixels, one of the plurality of pixels includes:

a light emitting device connected to a first reference node and emitting light;

a driving transistor connected between a power supply line receiving a power supply voltage and the first reference node;

a scan transistor connected between a data line and the first reference node and including a control electrode receiving a scan signal;

a first capacitor connected between the first reference node and a second reference node; and a shared transistor connected between the first reference node and the second reference node and including a control electrode receiving a shared control signal; and a second capacitor connected between the second reference node and a reference voltage line receiving a reference voltage, wherein the scan signal includes a scan section and a first initialization section for turning on the scan transistor, respectively, wherein, during the scan section, a data signal is applied to the data line, wherein, during the first initialization section, a first initialization voltage is applied to the data line, wherein the first capacitor and the shared transistor are connected in series between the first reference node and the second reference node, and wherein a control electrode of the driving transistor is connected to the second reference node.

16. The display device of claim 15, wherein the shared transistor includes a first electrode connected to the first reference node, a second electrode connected to the first capacitor, and the control electrode, wherein the first capacitor includes a first electrode connected to the second electrode of the shared transistor and a second electrode connected to the second reference node, and wherein, the second capacitor includes a first electrode connected to the second reference node and a second electrode connected to the reference voltage line.

17. The display device of claim 15, wherein the one of the plurality of pixels further includes a light emitting control transistor connected between the power supply line and the driving transistor, wherein the light emitting control transistor includes a first electrode connected to the power supply line, a second electrode connected to the driving transistor, and a control electrode receiving a light emitting control signal, wherein the shared control signal includes a shared section for turning on the shared transistor, wherein the light emitting control signal includes a light emitting section for turning on the light emitting control transistor, wherein, within one frame, the scan section precedes the first initialization section, and the first initialization section precedes the shared section and the light emitting section, and wherein the shared section and the light emitting section overlap each other.

18. The display device of claim 17, wherein the one of the plurality of pixels further includes a compensation transistor connected between the power supply line and the second reference node, wherein the compensation transistor includes a first electrode connected to the power supply line, a second electrode connected to the second reference node, and a control electrode receiving a compensation scan signal, wherein the compensation scan signal includes a compensation section for turning on the compensation transistor, wherein, within the one frame, the compensation section precedes the first initialization section, and wherein the compensation section and the scan section overlap each other.

19. The display device of claim 18, wherein the one of the plurality of pixels further includes an initialization transistor connected between an initialization line receiving a second initialization voltage and the second reference node, wherein the initialization transistor includes a first electrode connected to the second reference node, a second electrode connected to the initialization line, and a control electrode receiving an initialization scan signal, wherein the initialization scan signal includes a second initialization section for turning on the initialization transistor, and wherein, within the one frame, the second initialization section precedes the compensation section and the scan section.

* * * * *